Patented Oct. 30, 1928.

1,689,697

UNITED STATES PATENT OFFICE.

ERNEST W. THORNTON, OF EAST ORANGE, NEW JERSEY, ASSIGNOR TO R. B. DAVIS COMPANY, OF HOBOKEN, NEW JERSEY, A CORPORATION OF NEW JERSEY.

PHOSPHATE AND PROCESS.

No Drawing.    Application filed February 9, 1926. Serial No. 87,178.

This invention relates to a process of drying phosphates or mixtures containing phosphates and to the products thereby obtained. It relates more particularly to phosphates that are suitable for baking powders and in which the phosphates are in the form of dry, spherical particles of small size. In cases where it is desired to retard the rate of the chemical reaction of the phosphate with sodium bicarbonate, for example, when water is added, the phosphate particles may be coated with starch in accordance with this invention for that purpose.

In carrying out this invention a salt of phosphoric acid or a mixture of one or more salts of the same is dissolved or suspended in a liquid and the solution or suspension is sprayed into hot air or gases that are at sufficiently high temperatures to cause a sudden vaporization of the liquid, thus very rapidly drying the phosphate and forming fine particles of spherical shape. The size of the particles will depend in part upon the concentration of the solution or suspension, the temperature and velocity of the hot air or gases and the rate at which the solution or suspension is sprayed, but practically all of the particles will generally be small enough to pass through a twenty-five mesh screen and will be graduated in size down to a dust or impalpable powder. The dry particles can be separated from the drying air or gases subsequent to their formation in any convenient manner as, for example, in a settling chamber or by means of a cyclone or other type of air filter or collector.

The following are given as specific examples illustrative of the invention. Tricalcium phosphate, $Ca_3(PO_4)_2$, in the form of phosphate rock, bone ash, etc., may be treated with sulfuric acid to form mono-calcium phosphate, $CaH_4(PO_4)_2 \cdot 2H_2O$ in the well-known manner. The mono-calcium phosphate may be dissolved in water and the solution separated by filtration from the calcium sulphate that is formed as a by-product in the reaction and the solution of mono-calcium phosphate is then dried as above described by spraying it into a stream of hot air or gases and the dry particles are collected. It will generally be found preferable to have the solution as concentrated as possible before it is sprayed into the drying air or gas, that is, the solution is preferably saturated or nearly so before it is sprayed in. For this purpose it will sometimes be found to be necessary to evaporate the solution to concentrate it to the desired extent after it has been separated from the calcium sulphate.

Another example of the invention is in drying di-calcium phosphate. The di-calcium phosphate, $CaHPO_4$, may first be made by treating phosphoric acid, $H_3PO_4$, with lime, $Ca(OH)_2$. As the di-calcium phosphate is insoluble in water, it may be suspended in a finely divided state in water and the suspension may be sprayed into the hot air or gases, as above described, to form the dry particles.

In a similar way other phosphates, such as the primary, secondary and tertiary sodium salts of orthophosphoric acid and the sodium salts of meta and pyro phosphoric acid may be treated to obtain the small, dry particles in a spherical form.

It is frequently desirable to have starch or flour well mixed with phosphates especially when they are to be used for baking powder purposes. By the present invention, the desired degree of mixing can be readily obtained and products can be formed having highly desirable characteristics. In order to do this, it is merely necessary to add the proper amount of starch or flour to the solution or suspension of phosphate before it is sprayed into the drying air or gases, whereupon the dried particles of phosphate will be found to be mixed with dried starch or flour as a substantially homogeneous mixture of phosphate and starch or flour, which prevents the phosphate from reacting with other constituents of the baking powder until moisture is added. A substantially homogeneous mixture of starch and sodium phosphate can be obtained, for example, by spraying a wet mixture comprising about 60 parts by weight of a sodium phosphate and 40 parts of corn starch or flour into a stream of hot air at a temperature such that the moisture is very rapidly evaporated, whereupon substantially dry spherical particles of phosphate and starch will be produced. Temperatures in the neighborhood of 300° F. to 650° F. may be suitable.

I claim:

1. A salt of phosphoric acid in the form of small spherical particles.

2. A salt of phosphoric acid in the form of spherical particles small enough to pass a twenty-five mesh screen.

3. A sodium salt of phosphoric acid in the form of small spherical particles.

4. A salt of phosphoric acid in the form of small spherical particles mixed with starch.

5. Small spherical particles comprising approximately 60 parts by weight of phosphate and 40 parts of starch.

ERNEST W. THORNTON